United States Patent
Kim et al.

(10) Patent No.: US 10,558,852 B2
(45) Date of Patent: Feb. 11, 2020

(54) PREDICTIVE ANALYSIS OF TARGET BEHAVIORS UTILIZING RNN-BASED USER EMBEDDINGS

(71) Applicant: ADOBE INC., San Jose, CA (US)

(72) Inventors: Sungchul Kim, San Jose, CA (US); Deepali Jain, Karnataka (IN); Deepali Gupta, New Delhi (IN); Eunyee Koh, San Jose, CA (US); Branislav Kveton, San Jose, CA (US); Nikhil Sheoran, Chandigarh (IN); Atanu Sinha, Bangalore (IN); Hung Hai Bui, Sunnyvale, CA (US); Charles Li Chen, Athens, OH (US)

(73) Assignee: ADOBE INC., San Jose, CA (US)

( * ) Notice: Subject to any disclaimer, the term of this patent is extended or adjusted under 35 U.S.C. 154(b) by 19 days.

(21) Appl. No.: 15/814,979

(22) Filed: Nov. 16, 2017

(65) Prior Publication Data

US 2019/0147231 A1    May 16, 2019

(51) Int. Cl.
    *G06K 9/00* (2006.01)
    *G06N 3/04* (2006.01)
    *G06N 3/08* (2006.01)
    *G06F 16/954* (2019.01)
    *G06K 9/62* (2006.01)

(52) U.S. Cl.
    CPC ....... *G06K 9/00335* (2013.01); *G06F 16/954* (2019.01); *G06N 3/049* (2013.01); *G06N 3/0427* (2013.01); *G06N 3/0445* (2013.01); *G06N 3/08* (2013.01); *G06N 3/088* (2013.01); *G06K 9/6269* (2013.01)

(58) Field of Classification Search
    CPC . G06K 9/00335; G06K 9/6269; G06F 16/954
    See application file for complete search history.

(56) References Cited

U.S. PATENT DOCUMENTS

| 2017/0091615 A1* | 3/2017 | Liu | G06N 3/0445 |
| 2018/0046920 A1* | 2/2018 | Yang | G06Q 10/04 |
| 2018/0122401 A1* | 5/2018 | Iyer | G10L 21/0264 |
| 2018/0357321 A1* | 12/2018 | Cheng | G06Q 30/0631 |

\* cited by examiner

*Primary Examiner* — Gregory M Desire
(74) *Attorney, Agent, or Firm* — Shook, Hardy & Bacon, L.L.P.

(57) ABSTRACT

Systems and methods provide for generating predictive models that are useful in predicting next-user-actions. User-specific navigation sequences are obtained, the navigation sequences representing temporally-related series of actions performed by users during navigation sessions. To each navigation sequence, a Recurrent Neural Network (RNN) is applied to encode the navigation sequences into user embeddings that reflect time-based, sequential navigation patterns for the user. Once a set of navigation sequences is encoded to a set of user embeddings, a variety of classifiers (prediction models) may be applied to the user embeddings to predict what a probable next-user-action may be and/or the likelihood that the next-user-action will be a desired target action.

20 Claims, 5 Drawing Sheets

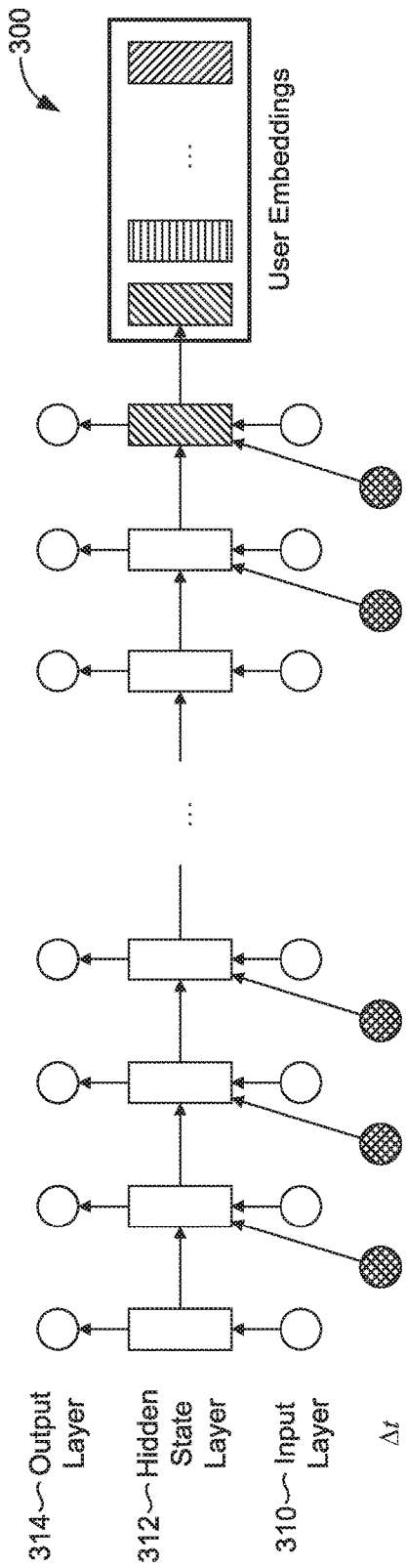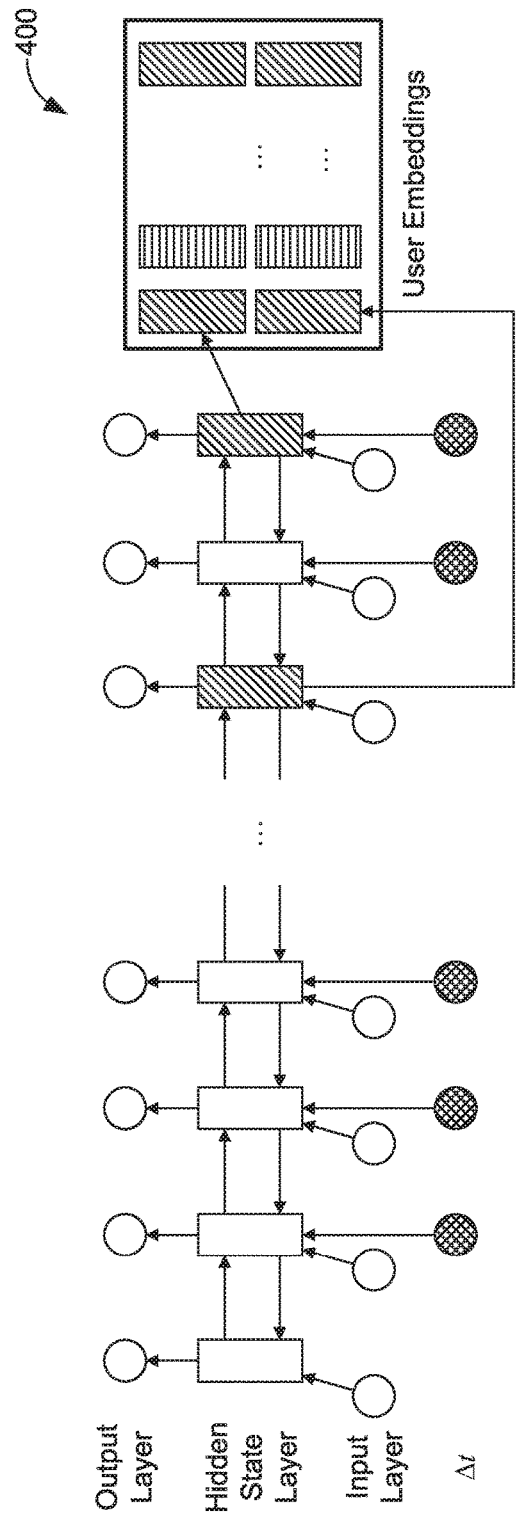

700

710 — OBTAIN A SET OF NAVIGATION SEQUENCES ASSOCIATED WITH A SET OF USERS, EACH INCLUDING A SET OF USER ACTIONS SEQUENTIALLY PERFORMED DURING A NAVIGATION SESSION ASSOCIATED WITH A PARTICULAR USER

712 — APPLY A TIME-AWARE RECURRENT NEURAL NETWORK (RNN) TO THE SET OF NAVIGATION SEQUENCES TO ENCODE EACH NAVIGATION SEQUENCE IN THE SET INTO A USER EMBEDDING THAT REFLECTS A TEMPORALLY-DEFINED NAVIGATION PATTERN FOR THE ASSOCIATED USER

714 — APPLY A CLASSIFIER TRAINED TO A SPECIFIC TARGET ACTION TO THE USER EMBEDDINGS TO CREATE A NEXT-USER-ACTION PREDICTIVE MODEL FOR PREDICTING THE PROBABILITY THAT A NEXT-ACTION PERFORMED BY A TARGET USER IS THE TARGET ACTION

610 — OBTAIN A SET OF NAVIGATION SEQUENCES ASSOCIATED WITH A SET OF USERS, EACH SEQUENCE INCLUDING A SET OF USER ACTIONS SEQUENTIALLY PERFORMED DURING A NAVIGATION SESSION ASSOCIATED WITH A PARTICULAR USER

612 — APPLY A RECURRENT NEURAL NETWORK (RNN) TO THE SET OF NAVIGATION SEQUENCES TO ENCODE EACH SEQUENCE IN THE SET INTO A USER EMBEDDING THAT REFLECTS A TEMPORALLY-DEFINED NAVIGATION PATTERN FOR THE ASSOCIATED USER

614 — APPLY A CLASSIFIER TO THE USER EMBEDDINGS TO CREATE A NEXT-USER-ACTION PREDICTIVE MODEL FOR PREDICTING NEXT-ACTIONS OF USERS

FIG. 6

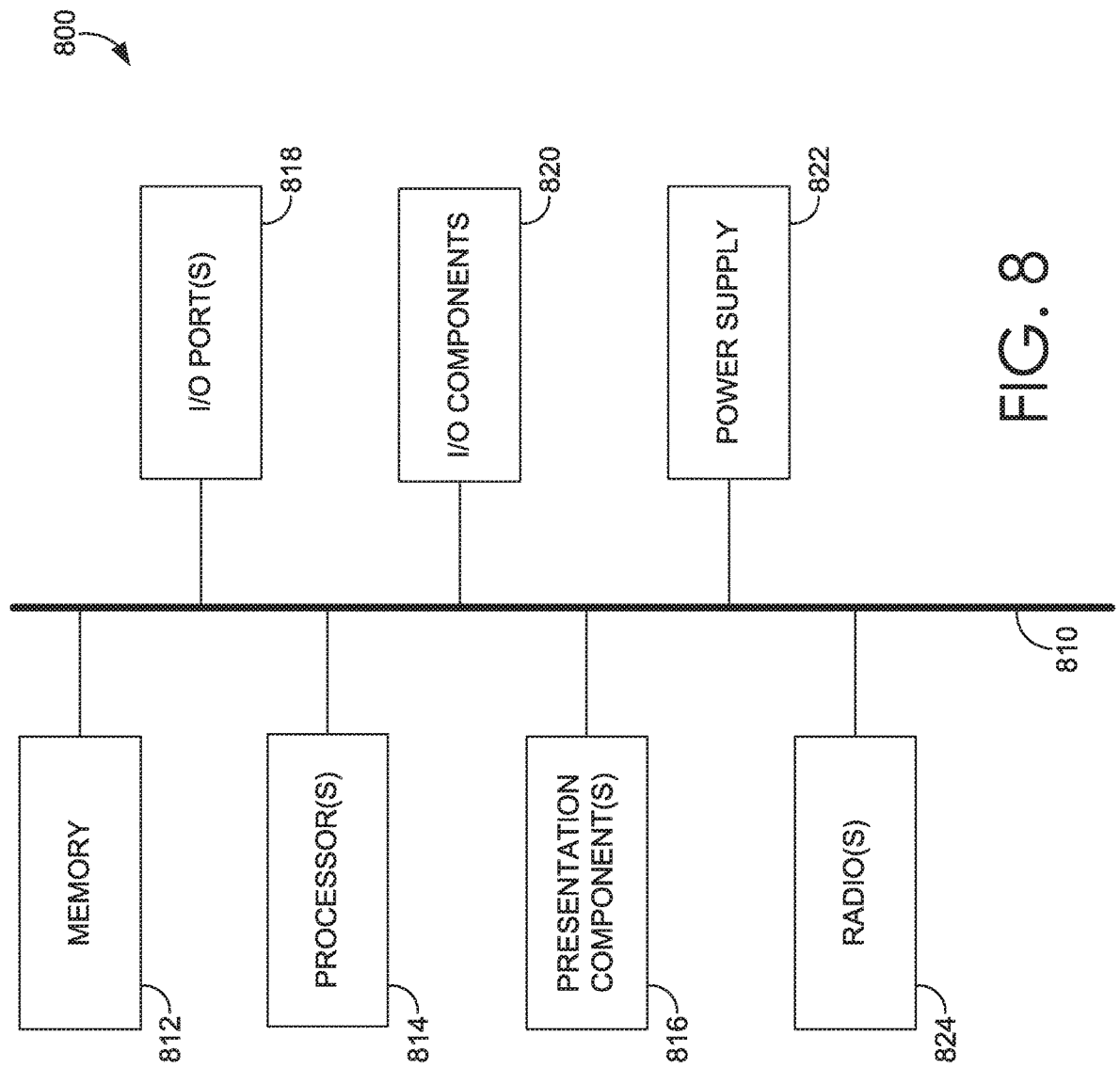

PREDICTIVE ANALYSIS OF TARGET BEHAVIORS UTILIZING RNN-BASED USER EMBEDDINGS

BACKGROUND

With the rapid growth of mobile devices, a number of user behavior logs have been (and are being) generated by users utilizing their devices (e.g., cellular telephones, tablets, and desktop computing devices) to access webpages and/or mobile services. These user behavior logs contain latent intentions and interests of users. Accordingly, there have been attempts to leverage user behavior logs for solving real-world problems in both academia and industry. For instance, predicting a user's next action or behavior is critical for providing enhanced user experiences. Additionally, many content providers (e.g., companies, corporations, service providers, and the like) are interested in whether or not users being presented with the provided content are being presented with the content they desire. Further, content providers are interested in how likely it is that users will perform certain target behaviors, for instance, converting (making a purchase), providing a recommendation, continuing to browse or view, navigating away from the provided content, or the like.

Creating models that approximate a given user's typical browsing, purchasing, and/or content viewing behavior is an important strategy many content providers would like to employ, particularly as it pertains to new customer acquisition. However, such content providers are faced with many challenges surrounding how to analyze and leverage this log-traced data for supporting real-world applications.

Prior attempts have been made to use machine learning techniques to address some of these issues. Most of them, however, require that the input data has a matrix form. Thus, additional effort is required to represent the sequential, log-traced and temporally-arranged data into a matrix form. For instance, some prior attempts to use machine learning techniques to address these issues focus on feature engineering to extract features from the sequential data that are deemed important and represent the extracted features in the form of a matrix. Once in matrix form, such techniques train the model in a supervised manner with specific tasks and labels (e.g., conversion rates and click-through probabilities).

Recurrent Neural Networks (RNNs) have been used for solving various prediction tasks in many areas. For instance, RNNs have been especially useful in Natural Language Processing tasks where RNNs have shown superior performance on machine translation, document classification, and sentiment analysis. However, event sequence data generally contains information such as timestamps, user tags, and session information, which can be useful but is generally not considered in matrix-based machine learning techniques.

SUMMARY

Embodiments of the present invention relate to generating predictive models that are useful in predicting next-user-actions utilizing Recurrent Neural Networks (RNNs) and predicting the likelihood of target behaviors. To generate and train such models, user-specific navigation sequences are obtained, for instance, from one or more user behavior log repositories. Each navigation sequence obtained represents a temporally-related series of actions performed by a user during a navigation session. To each of the navigation sequences, a RNN is applied to encode each navigation sequence into a set of user embeddings that reflects time-based, sequential navigation patterns for the user. The user embeddings then may be utilized to predict next-user-actions. Further, once a set of navigation sequences is encoded to a set of user embeddings, a variety of classifiers (prediction models) may be applied to the user embeddings to predict the likelihood that the next action of the user will be a target behavior or action, that is, an action in which a content provider is interested (e.g., conversion, recommendation, user churn, etc.).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a schematic diagram diagrams illustrating an exemplary Time-Aware Recurrent Neural Network in accordance with implementations of the present disclosure;

FIG. 4 is a schematic diagram illustrating an exemplary Time-Aware Bi-Directional Recurrent Neural Network in accordance with implementations of the present disclosure;

FIG. 6 is a flow diagram illustrating an exemplary method for generating next-user-action and/or target behavior predictive models using navigation sequences in accordance with implementations of the present disclosure;

FIG. 7 is a flow diagram illustrating an exemplary method for generating next-user-action and/or target behavior predictive models using navigation sequences in accordance with implementations of the present disclosure; and FIG. 8 is a block diagram of an exemplary computing environment suitable for use in implementations of the present disclosure.

DETAILED DESCRIPTION

Figure 1:
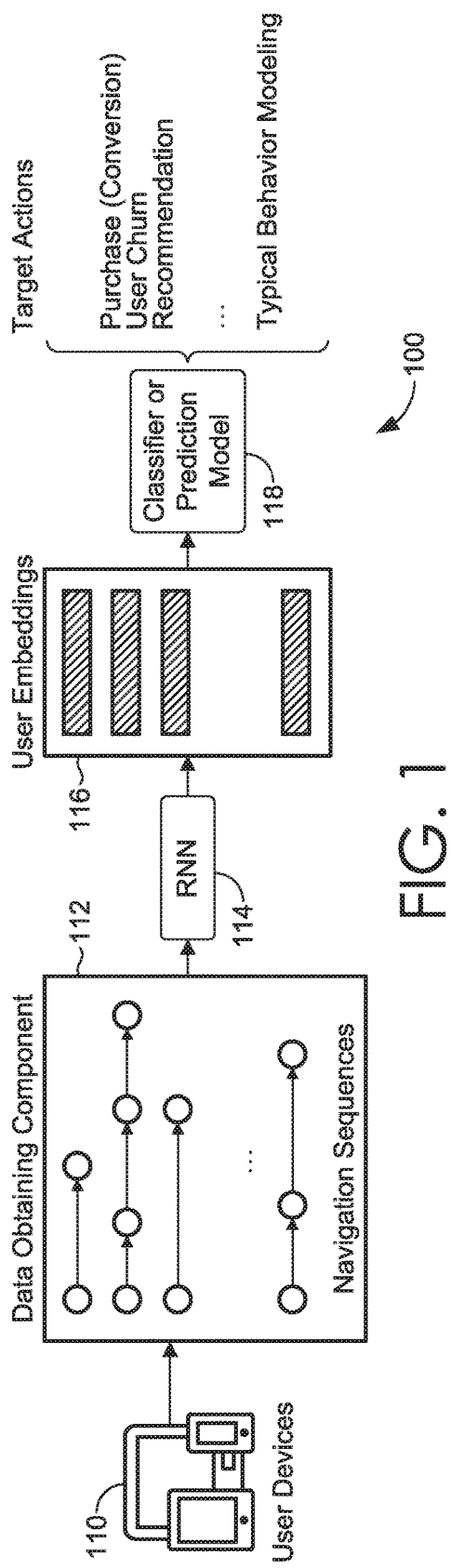
FIG. 1 is a schematic diagram illustrating an exemplary system in accordance with implementations of the present disclosure.

The subject matter of the present invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present and/or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "navigation sequence" refers to a sequence of actions performed by a user during a navigation session on a particular platform (e.g., a website). A navigation sequence includes not only identifiers for actions performed by the user but also the sequential order in which a plurality of actions is performed. As more fully described below, the sequential order of a user's actions during a navigation session can indicate the user's latent intention and, accordingly, is useful in predicting what action the user is likely to take next and/or the likelihood that the user's next action will be a target behavior or action.

The term "navigation session," as used herein, refers to a period of user engagement with a particular platform (e.g., a website). For example, a navigation session may be only a few seconds or moments in length during which time the user concentrates on a particular page within a website, or a navigation session may be several minutes in length during which time the user visits several pages within a website. The period of engagement (and, thus, the navigation session) begins upon the first user interaction with the platform and ends upon a period of inactivity with respect to the platform. For instance, a period of engagement may begin when a user initially accesses a particular website and end once the user has failed to engage with the website for a period of five minutes. The length of the period of inactivity that triggers the end of a navigation session may be standard or customized as desired.

The term "temporally-defined navigation pattern" refers to pattern of user behavior or actions, as evidenced by a user's interaction with particular platforms, and includes not only actions engaged in by the user but also the temporal relationship between the actions. In embodiments, a "temporally-defined navigation pattern" may be determined based on a single navigation sequence of the user. In other embodiments, a "temporally-defined navigation pattern" may be determined based on a summary of the user's engagement behavior as evidenced by a plurality of navigation sequences associated with the user.

The term "user action" refers to a defined action of a user taken while the user is engaged with a particular platform, the user actions being defined based upon actions in which content providers (e.g., marketers, companies, corporations, service providers, or the like) may be interested. Such actions may include, without limitation, a user: navigating to a homepage, interacting with search results, adding an item to an online shopping cart, accessing cart checkout, changing display attributes, engaging in a chat with another individual associated with a platform, making a payment, utilizing a coupon, accessing a credit center associated with a platform, accessing customer support, accessing or joining a review community, writing a review, viewing local ads, finding a local store, signing in or registering, accessing a user's account, accessing a user's orders, tracking a user's order, selecting a product, engaging in a product comparison, accessing product categories, accessing product details, engaging in or inquiring about product rental, or placing an order. It will be understood and appreciated by those having ordinary skill in the art that this list of user actions is provided merely by way of example, and not limitation. Any action in which a user engages as it pertains to a particular online platform may be defined as a "user action" within the scope of embodiments of the present disclosure.

The term "next-user-action" refers to an action a user is likely to engage in next. That is, given a navigation sequence containing a series of actions engaged in sequentially as A, B, C, D and E, the "next-user-action" is any action the user is likely to engage in subsequent to action E. Predictive models in accordance with embodiments of the present disclosure may output a single next-user-action (e.g., the most likely next-action in which the user will engage) or a plurality of next-user-actions, each possible action being associated with a probability that such action will be the next-action taken by the user. As more fully described below, likely or probable next-user-actions are determined utilizing a next-user-action predictive model that analyzes a user's temporally-defined navigation patterns to calculate the probability with which one or more next-user-actions may occur.

A next-user-action predictive model in accordance with embodiments of the present disclosure may output one or more probable next-user-actions. In other embodiments, if the model is provided with a particular action in which a content provider is interested (i.e., a target action or behavior), the predictive model in accordance with embodiments hereof may output a probability that the particular action is likely to be the next-user-action. Thus, as utilized herein, the terms "target action" or "target behavior" refer to any defined action for which a probability that such action will be the next-user-action is desired. In embodiments of the disclosure, a probability may be presented as a percentage or distribution. In other embodiments, the probability may be provided as associated with a binary "yes" or "no" value indicating whether the model predicts the target action to be the next-user-action.

The term "target user," as used herein, refers to a particular user whose navigation behavior is being analyzed. In embodiments of the disclosure, navigation sequences may be used to train the predictive model. Once trained, a navigation sequence associated with a target user may be input into the model to determine the probable next-user-action of the target user and/or the likelihood that the user's next-user-action will be a target action or behavior.

The term "classifier," as used herein, refers to any statistical and/or machine learning technique that may be utilized to analyze user behavior data. This includes models that may be applied to user embeddings based upon navigation sequences to predict next-user-actions and/or the likelihood that the user's next-user-action will be a target action or behavior.

Predicting the probable next-user-actions of visitors to a platform, such as a website, has been of interest to marketers and others since eCommerce began. For an eCommerce site, two questions are of importance: (1) "Will the customer make a purchase?" and (2) "What will they purchase?" Obviously, the second question is conditioned on the first. Thus, much focus is on this first "necessary" condition under the premise that users' interactions with a platform are a significant determinant of whether they will make a purchase. Both academic and industry research have devoted considerable efforts in this direction. From a data perspective, these efforts rely upon data on many facets of users (e.g., consumers) and their web behaviors, including consumer profiles and click-stream of consumers' digital footprints on the websites.

On the modeling side, these efforts either require intricate hand-crafted prediction models, or use simple models (e.g., logistic regression, random forest) that do not recognize the temporal dependence in behaviors that a user exhibits during engagement with the platform. For instance, imagine a consumer makes a purchase at a particular eCommerce website. Before purchasing, she explores by clicking on filters, typing in a search bar, viewing product pages and so on. The consumer keeps updating her information set based on her past sequence of clicks, not just the previous click. Her future sequence of clicks is also related to the past clicks. Thus, the click-streams are in the form of sequences of actions. To not recognize the whole sequence of actions explicitly in the next-user-action analysis is a drawback of current methods of purchase prediction, including, e.g., Hidden Markov Models.

Embodiments of the present disclosure address this drawback of traditional methods by introducing navigation sequence predictive models, such as recurrent neural networks (RNN), into click-stream-based prediction of next-user-actions. RNNs can provide recognition of navigation sequences and, with flexibility in defining input and output sequences, address some of the needs for hand-crafting germane to existing models.

Embodiments of the present disclosure relate to generating predictive models that are useful in predicting next-user-actions utilizing RNNs and predicting the likelihood of target behaviors. To generate and train such models, user-specific navigation sequences are obtained, for instance, from one or more user behavior logs. Each user-specific navigation sequence includes a sequence of actions performed by a user during a navigation session (i.e., a period of engagement) on a particular platform (e.g., a website). Navigation sequences include not only identifiers for actions performed by the user but also the sequential order in which the sequence of actions is performed. In embodiments, each navigation sequence is presented as a series of tuples, each tuple comprising (1) an identifier of a user action taken at a particular point in time, (2) an identifier associated with the user that performed the user action taken, and (3) an indicator of an amount of time spent on the user action taken.

To each of the navigation sequences, a RNN is applied to encode each navigation sequence into a set of user embeddings that reflects time-based, sequential navigation patterns for the user. RNNs can learn the temporal dependence across several sequential points in time and have been used in a variety of domains from language modeling, to speech recognition and motion capture. However, RNNs have not been used in predicting next-user-actions in browsing and purchasing behavior. In embodiments, the RNN may be a Time-Aware RNN (TRNN) which may include Long Short Term Memory (LSTM) architecture. LSTM architecture has the ability to generate long sequences by predicting one data point at a time. The click-stream data generated through consumers' actions provides rich and long sequences for applying LSTM for predicting next-user-actions. LSTMs are especially well-suited for learning dependencies of long sequences of user actions, reminiscent of a consumer's click-stream. In other embodiments, the RNN may be a Time-Aware Bi-Directional RNN (TBiRNN). It will be understood and appreciated by those having ordinary skill in the art that embodiments hereof are not limited to the specific type of RNN utilized.

Once a set of navigation sequences is encoded to a set of user embeddings, a variety of classifiers (prediction models) may be applied to the user embeddings to predict the likelihood that the next action of the user will be a target behavior or action, that is, an action in which a content provider (e.g., marketer, company, corporation, service provider, or the like) is interested (e.g., conversion, recommendation, user churn, etc.).

With reference now to the drawings, FIG. 1 is a block diagram illustrating an exemplary system 100 for generating models for predicting next-user-actions with respect to a platform (e.g., a website), and/or predicting the likelihood that a next-user-action will be a target action, in accordance with implementations of the present disclosure. Given a set of navigation sequences obtained from a plurality of user devices 110, the system 100 learns user embeddings via a RNN to support predictive analysis of next-user-actions, such as, by way of example only, click-probability, user churn, purchase probability and users' preferred items. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a plurality of user devices 110, a data obtaining component 112, a RNN 114 and a classifier 118. The plurality of user devices 110 may include any combination of, by way of example only, cellular devices, tablets, desktop computers, or the like. The plurality of user devices 110 obtains data about the browsing and purchasing behavior of their respective users. The data obtained is in the form of user-specific navigation sequences (illustrated as nodes representing actions taken and directional arrows indicating the temporal direction of the actions). Each user-specific navigation sequence includes a sequence of actions performed by a user during a navigation session (i.e., a period of engagement that does not include a substantial time period of non-engagement) on a particular platform (e.g., a website or mobile service platform). Navigation sequences include identifiers for actions performed by the user (represented as nodes in association with the data obtaining component 112 of FIG. 1, more fully described below) and information regarding the sequential order in which the sequence of actions is performed. (represented as directional arrows in association with the data obtaining component 112 of FIG. 1, more fully described below). In embodiments, each navigation sequence is presented as a series of tuples, each tuple comprising (1) an identifier of a user action taken at a particular point in time, (2) an identifier associated with the user that performed the user action taken, and (3) an indicator of an amount of time spent on the user action taken.

The navigation sequences obtained from the plurality of user devices 110 are provided to the data obtaining component 112. The data obtaining component 112 stores the navigation sequences until such time as further processing is initiated. During training of a predictive model useful for predicting next-user-action in accordance with embodiments hereof, the data obtaining component 112 may take the form of a data repository associated with one or more platforms. When running a trained predictive model to predict a future next-action of a user and/or the likelihood that a next action will be a target action or behavior, the data obtaining component 112 may pass an event sequence directly from a user device 110 to the RNN 114.

As illustrated, navigation sequences obtained by the data obtaining component 112 are illustrated as a series of nodes connected by arrows (indicating the sequential direction of the user actions included in the navigation sequences). Each node in the illustrated navigation sequences represents an action. Exemplary nodes may contain information resembling the following examples of user behavior logs including device identifiers, timestamps and user action identifiers:

| | |
|---|---|
| 1451923253 | Tablet: XYZ 3.2.1 (50) |
| 1451923258 | Mobile: App/201512161 |
| 1451923261 | Mobile: App/us/en/myplans/landing/phone |
| 1451923267 | Tablet: App/us/en/home |
| 1451923275 | Mobile: App/us/en/photopass |
| 1453310277 | Tablet: App/us/en/explore/thingstodo/home |
| 1453310605 | Mobile: App/us/en/tools/modifyselectpeople |

The data obtaining component 112 passes the navigation sequences to the RNN 114. The RNN 114 encodes the navigation sequences into a set of user embeddings 116 that reflects time-based, sequential navigation patterns for the user. In embodiments, the RNN 114 may be a Time-Aware RNN (TRNN) (which may include Long Short Term Memory (LSTM) architecture). With reference to FIG. 3, illustrated is a schematic diagram showing an exemplary TRNN 300 in accordance with implementations of the present disclosure. TRNN consists of an input layer 310, a hidden layer 312 with recurrent connections that convey signals from previous states, and an output layer 314. As shown, the input vector $a_t$ represents a user action at time t from "action embedding" which may be a pre-trained embedding from another model (e.g., word2vec) or may be trained simultaneously with the predictive model described herein. The hidden layer maintains a representation of the user's navigation sequence, which will be used as a user embedding at the last time-point. With the result from the output layer, a probability distribution may be computed over user actions, so that next-user-actions may be predicted based on them.

More formally, given an input layer $\vec{a}_t$, the hidden layer $\vec{h}_t$ and the output layer $\vec{o}_t$ can be obtained as follows:

$$\vec{i}_t = \sigma(\vec{W}_{ai} \cdot \vec{a}_t + \vec{W}_{hi} \cdot \vec{h}_{t-1} + \vec{b}_i) \quad (1)$$

$$\vec{f}_t = \sigma(\vec{W}_{af} \cdot \vec{a}_t + \vec{W}_{hf} \cdot \vec{h}_{t-1} + \vec{b}_f) \quad (2)$$

$$\vec{c}_t = \vec{f}_t \vec{c}_{t-1} + \vec{i}_t \cdot \phi(\vec{W}_{ac} \cdot \vec{a}_t + \vec{W}_{hc} \cdot \vec{h}_t + \vec{b}_h) \quad (3)$$

$$\vec{o}_t = \sigma(\vec{W}_{ao} \cdot \vec{a}_t + \vec{W}_{ho} \cdot \vec{h}_{t-1} + \vec{b}_o) \quad (4)$$

$$\vec{h}_t = \vec{o}_t \cdot \phi(\vec{c}_t) \quad (5)$$

where $\vec{i}_t$, $\vec{f}_t$, $\vec{c}_t$, and $\vec{o}_t$ indicate the input gate, memory cell, and output gate respectively. $\vec{W}_{xy}$ is the weight matrix from vector x to y, and $\sigma(\bullet)$ and $\phi(\bullet)$ is an activation function which is a sigmoid and hyperbolic tangent function.

One obvious difference between conventional sequential data and navigation sequences is each user action in a navigation sequence includes timestamp. Utilization of the temporal information permits more accurate modeling of user behavior patterns. More particularly, the time difference between consecutive user actions and smoothed values may be computed by using $g(t_t)=\min((t_t-t_{t-1})/t_{max}, 1.0)$. This value is included in the input vector as $[a_t, g(\Delta t)]$. In the FIG. 2 architecture of TRNN, the grey-shaded circles indicate the time difference between two consecutive actions.

In other embodiments, the RNN 114 of FIG. 1 may be a Time-Aware Bi-Directional RNN (TBiRNN). It will be understood and appreciated by those having ordinary skill in the art that embodiments hereof are not limited to the specific type of RNN utilized. With reference to FIG. 4, illustrated is a schematic diagram showing an exemplary TBiRNN 400 in accordance with implementations of the present disclosure. Compared to general words and sentences on which TBiRNNs traditionally have been utilized, user behavior logs are longer and contain more dynamic context. To handle this, embodiments hereof create user embeddings which are concatenated vectors of the last hidden state and the first hidden state of the last navigation session. Formally, TBiRNN computes the output from forward hidden state vector $\vec{h}_t$ and the backward hidden state vector $\overleftarrow{h}_t$ by iterating the backward layer from t to 1 as follows:

$$\vec{h}_t = \sigma(\vec{W}_{ah} \cdot a_t + \vec{W}_{hh} \cdot \vec{h}_{t-1} + \vec{b}_h) \quad (6)$$

$$\overleftarrow{h}_t = \sigma(\overleftarrow{W}_{ah} \cdot a_t + \overleftarrow{W}_{hh} \cdot \overleftarrow{h}_{t+1} + \overleftarrow{b}_h) \quad (7)$$

$$o_t = \phi(\vec{W}_{ho} \cdot \vec{h}_t + \overleftarrow{W}_{ho} \cdot \overleftarrow{h}_t + b_o) \quad (8)$$

where there are two separate weight matrix in the hidden layer, $\vec{W}_{xy}$ and $\overleftarrow{W}_{xy}$ according to the direction. As discussed herein, TiBiRNN combines BiRNN with LSTM layers. After training the model, given an event sequence, the user embeddings take the form of $[\vec{h}_{t_m}, \overleftarrow{h}_{t_j}]$ where $t_m$ is the last time and $t_j$ is the first time at the last navigation session.

Figure 5:
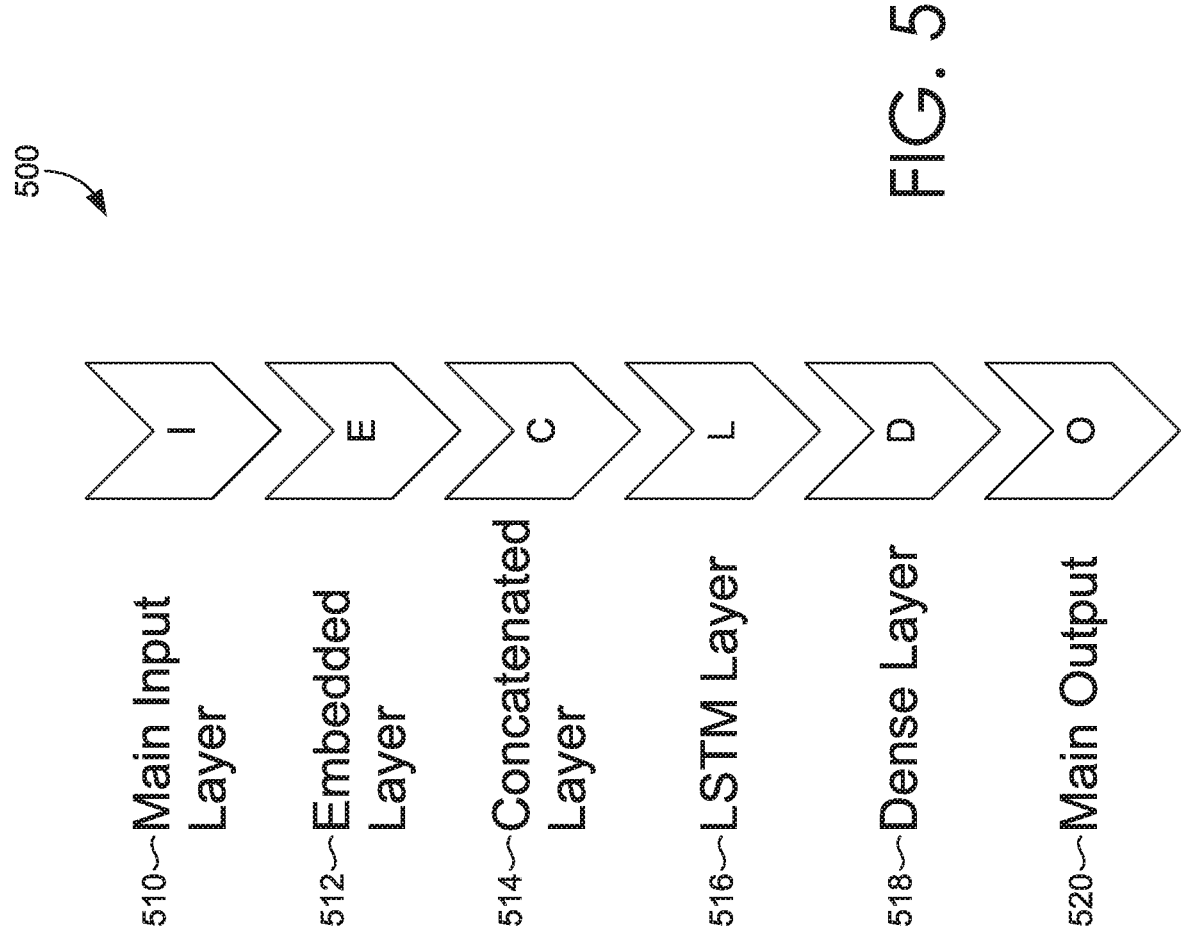
FIG. 5 is a schematic diagram illustrating an exemplary Recurrent Neural Network with Long Short Term Memory architecture in accordance with implementations of the present disclosure.

In embodiments, the RNN 114 of FIG. 1 may be a TRNN having Long Short Term Memory (LSTM) architecture. FIG. 5 is a schematic diagram illustrating an exemplary RNN with LSTM architecture 500 in accordance with implementations of the present disclosure. LSTM architecture has the ability to generate long sequences by predicting one data point at a time. The click-stream data generated through consumers' actions provides rich and long sequences for applying LSTM for predicting next-user-actions. LSTMs are especially well-suited for learning dependencies of long sequences of user actions, reminiscent of a consumer's click-stream.

As illustrated in FIG. 5, the RNN with LSTM 500 includes a main input layer 510, an embedded layer 512, a concatenated layer 514, an LSTM layer 516, a dense layer 518 and a main output 520. The main input layer 510 receives input data one time step at a time (nodes illustrated in FIG. 2) for each navigation sequence. In embodiments, each navigation sequence is input as a series of tuples, each tuple comprising (1) an identifier of a user action taken at a particular point in time, (2) an identifier associated with the user that performed the user action taken, and (3) an indicator of an amount of time spent on the user action taken.

The embedding layer 512 receives the input from the main input layer 510 and embeds the categorical variables from the tuples (i.e., the identifier of the user action and the identifier of the user that performed the user action) into a hidden or latent space. In other words, the embedding layer 512 embeds the categorical variables such that they are represented as numerical information.

The embedded categorical variables from the embedding layer 512 and the indicator of the amount of time spent on a user action from the main input layer 510 are passed to the concatenated layer 514 where the two vectors (input sources) are concatenated together. The concatenated input is then fed into the LSTM layer 516. The LSTM layer acts as the memory unit of the model. The hidden state of the LSTM is carried over as input to the future time step, thus allowing the predictive model a theoretical look back. The output from the LSTM layer 516 is then fed into the fully connected dense layer 518 which produces the output user embeddings through sigmoid activation.

The next-user-action prediction model is trained to optimize a custom objective function, i.e., Binary crossentropy (B) with TD(0)-error (TD) based regularization. (Temporal Difference (TD)-based regularization permits the model to achieve data convergence in less time than when absent such regularization.) Such may be described as:

$$E = \gamma(t)*B(t) + (1-\gamma(t))*TD(t) \quad (1)$$

$$B(t) = -1 * y_t \log p_t \quad (2)$$

$$TD(t) = (p_t - p_{t+1})^2 \quad (3)$$

where, $y_t$ is the ground truth (1 for target action and 0 for no target action) and $p_t$ is the predicted probability of the target action at time t. $\gamma(t)$ is the recency factor. It takes value 1 for the most recent action (at the end of action sequence) and decreases geometrically by a value g∈[0, 1] as user actions occur further back in time. In an exemplary embodiment, after hyper-parameter tuning of the model, g=0.98 was selected. This value may depend on different datasets and models and is not immutable.

With reference back to FIG. 1, the output of the RNN 114 (whether it be a TRNN as illustrated in FIG. 3, a TBiRNN as illustrated in FIG. 4, or an RNN with LSTM architecture as illustrated in FIG. 5, or any other RNN known to those having ordinary skill in the art), is a plurality of user embeddings that reflect time-based sequential navigation patterns of the user. The set of user embeddings may be utilized to predict next-user-actions. Once a set of navigation sequences is encoded to a set of user embeddings, a variety of classifiers or prediction models 118 may be applied to the user embeddings 116 to predict the likelihood that the next action of the user will be a target action or behavior in which a content provider is interested (e.g., purchase (conversion, recommendation, user churn, etc.).

Figure 2:
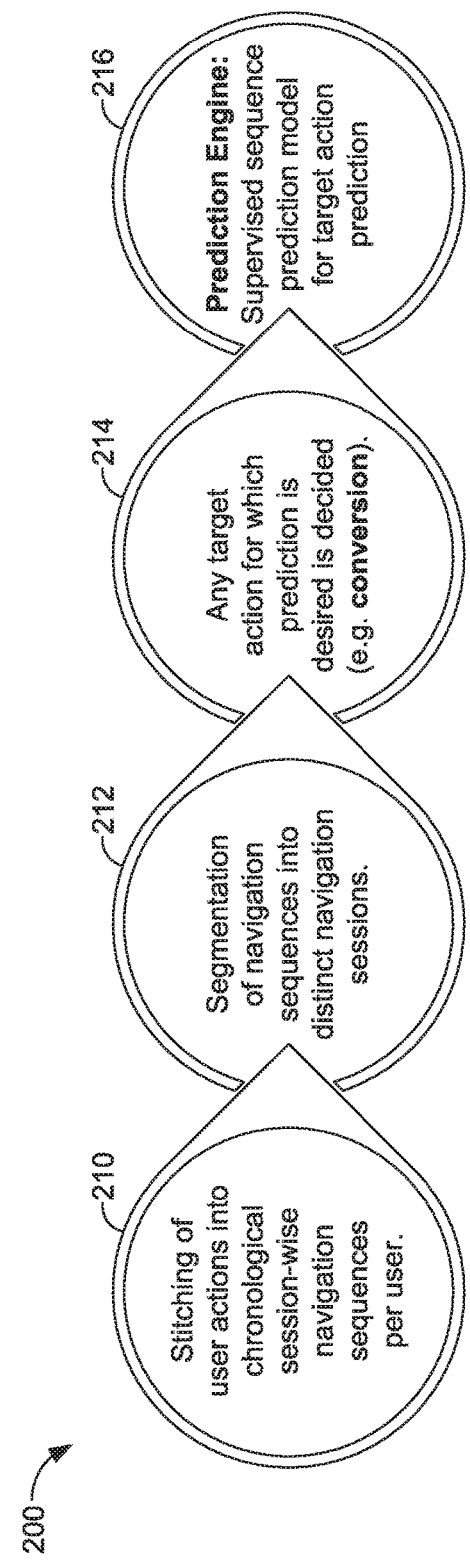
FIG. 2 is a schematic diagram showing an exemplary work flow for generating next-user-action and/or target behavior predictive models using navigation sequences in accordance with implementations of the present disclosure.

Turning now to FIG. 2, a schematic diagram is illustrated showing an exemplary high-level work flow 200 for generating next-user-action and target behavior predictive models using navigation sequences in accordance with implementations of the present disclosure. More detailed methods are discussed below h reference to FIGS. 6 and 7. Each block of the method 200 and any other methods described herein comprises a computing process that may be performed using any combination of hardware, firmware, and/or software. For instance, various functions may be carried out by a processor executing instructions stored in memory. The method also may be embodied as computer-usable instructions stored on computer storage media. The method may be provided by a standalone application, a service or hosted service (standalone or in combination with another hosted service), or a plug-in another product, to name a few. The method 200 may be performed, for instance, by the system 100 of FIG. 1.

Initially, as shown at block 210, user actions (i.e., customers actions) are stitched together into chronological, session-wise navigation sequences on a per user customer) basis. In other words, block 210 illustrates obtaining of the navigation sequences from one or more user devices (e.g., user devices 110 of FIG. 1).

As shown at block 212, navigation sequences are segmented. That is, the navigation sequences are broken into distinct navigation sessions. Within each navigation session, the sequence of user actions, and time spent on each action, are taken as features for predicting next-user-action. Multiple sessions engaged in by a particular user are recognized by the user identifier (the user identifier, action taken and time spent on the action being represented, in embodiments, as tuples, as more fully described above).

As shown at block 214, any target action for which prediction is desired is decided. For instance, an interested party (e.g., a marketer) may desire to predict the probability with which a conversion (purchase) will take place as the next-user-action. The input and target user action are fed to the prediction engine (i.e., classifier or prediction model 118 of FIG. 1), as shown at block 216, where a supervised sequence prediction model is run for the target action to predict the likelihood that the target action will be the next-user-action.

Referring now to FIG. 6, a flow diagram is provided illustrating a method 600 for generating predictive models that are useful for predicting next-user-actions. Each block of the method 600 and any other methods described herein comprises a computing process that may be performed using any combination of hardware, firmware, and/or software. For instance, various functions may be carried out by a processor executing instructions stored in memory. The methods also may be embodied as computer-usable instructions stored on computer storage media. The methods may be provided by a standalone application, a service or hosted service (standalone or in combination with another hosted service), or a plug-in to another product, to name a few. The method 600 may be performed, for instance, by the system 100 of FIG. 1.

Initially, as shown at block 610, a set of navigation sequences associated with a set of users is obtained. Each navigation sequence in the set includes a set of user actions sequentially performed during a navigation session. Additionally, each navigation sequence is associated with a user included in the set of users. In embodiments, each navigation sequence is presented as a series of tuples, each tuple comprising (1) an identifier of a user action taken at a particular point in time, (2) an identifier associated with the user that performed the user action taken, and (3) an indicator of an amount of time spent on the user action taken.

As shown at block 612, a Recurrent Neural Network (RNN) is applied to the set of navigation sequences to encode each navigation sequence in the set into a user embedding that reflects a temporally-defined navigation pattern for the associated user. In embodiments, the RNN may be a Time-Aware RNN (TRNN). TRNNs were discussed herein above with respect to FIG. 3. In embodiments, the TRNN may include Long Short Term Memory (LSTM) architecture. LSTM architecture has the ability to generate long sequences by predicting one data point at a time. LSTMs are especially well-suited for learning dependencies of long sequences of user actions, reminiscent of a user's (e.g., consumer's) click-stream. A TRNN with LSTM architecture was discussed in more detail above with reference to FIG. 5. In other embodiments, the RNN may be a Time-Aware Bi-Directional RNN (TBiRNN). TBiRNNs were more fully discussed above with reference to FIG. 4.

Returning to FIG. 6, as shown at block 614, a classifier is applied to the user embeddings to create a next-user-action predictive model for predicting next-actions of users. In embodiments, a variety of classifiers (prediction models) may be applied to the user embeddings to predict what a probable next-user-action may be and/or the likelihood that the next-user-action will be a target action in which a content provider (e.g., marketer, company, corporation, service provider, or the like) is interested.

Referring now to FIG. 7, a flow diagram is provided illustrating a method 700 for generating predictive models that are useful for predicting next-user-actions. Each block of the method 700 and any other methods described herein comprises a computing process that may be performed using any combination of hardware, firmware, and/or software. For instance, various functions may be carried out by a processor executing instructions stored in memory. The methods also may be embodied as computer-usable instructions stored on computer storage media. The methods may be provided by a standalone application, a service or hosted service (standalone or in combination with another hosted service), or a plug-in to another product, to name a few. The method 700 may be performed, for instance, by the system 100 of FIG. 1.

Initially, as shown at block 710, a set of navigation sequences associated with a set of users is obtained. Each navigation sequence in the set includes a set of user actions sequentially performed during a navigation session. Additionally, each navigation sequence is associated with a user included in the set of users. Each navigation sequence further is presented as a series of tuples, each tuple comprising (1) an identifier of a user action taken at a particular point in time, (2) an identifier associated with the user that performed the user action taken, and (3) an indicator of an amount of time spent on the user action taken.

As shown at block 712, a Time-Aware Recurrent Neural Network (TRNN) is applied to the set of navigation sequences to encode each navigation sequence in the set of navigation sequences into a user embedding that reflects a temporally-defined navigation pattern for the associated user. TRNNs were discussed herein above with respect to FIG. 3. In embodiments, the TRNN may include Long Short Term Memory (LSTM) architecture. LSTM architecture has the ability to generate long sequences by predicting one data point at a time. LSTMs are especially well-suited for learning dependencies of long sequences of user actions, reminiscent of a user's (e.g, consumer's) click-stream. A TRNN with LSTM architecture was discussed in more detail above with reference to FIG. 5.

As shown at block 714, a classifier trained to a specific target action is applied to the user embeddings to create a next-user-action predictive model for predicting the probability that a next-action performed by a target user is the target action. In embodiments, a variety of classifiers (prediction models) may be applied to the user embeddings to predict the probability that a next-action performed by a target user is the target action.

Having described implementations of the present disclosure, an exemplary operating environment in which embodiments of the present invention may be implemented is described below in order to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

As described above, implementations of the present disclosure relate to generating predictive models for predicting next-user-actions based upon temporally-defined navigation sequences. Embodiments of the present invention have been described in relation to particular aspects, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objectives set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating next-user-action predictive models using navigation sequences, the method comprising:
  obtaining a set of navigation sequences associated with a set of users, each navigation sequence in the set of navigation sequences including a set of user actions sequentially performed during a navigation session, and each navigation sequence being associated with a user included in the set of users;
  applying a Recurrent Neural Network (RNN) to the set of navigation sequences to encode each navigation sequence in the set of navigation sequences into a user embedding that reflects a temporally-defined navigation pattern for the associated user; and
  applying a classifier to the user embeddings to create a next-user-action predictive model for predicting next-actions of users.

2. The computer-implemented method of claim 1, wherein the RNN is a Time-Aware RNN.

3. The computer-implemented method of claim 1, wherein the RNN is a Time-Aware Bi-Directional RNN.

4. The computer-implemented method of claim 1, wherein the RNN includes Long Short Term Memory architecture.

5. The computer-implemented method of claim 1, wherein the set of navigation sequences is obtained as a series of tuples, each tuple comprising (1) an identifier of a user action taken at a particular point in time, (2) an identifier associated with a user that performed the user action taken, and (3) an indicator of an amount of time spent on the user action taken.

6. The computer-implemented method of claim 1, further comprising:
  obtaining a navigation sequence from a first user; and
  applying the next-user-action predictive model to the navigation sequence to predict a probable next-action of the first user.

7. The computer-implemented method of claim 1, further comprising identifying one or more subsets of users, each subset including users included in the set of users that are associated with a similar temporally-defined navigation pattern.

8. The computer-implemented method of claim 7, wherein the one or more subsets of users are identified utilizing K-means clustering.

9. The computer-implemented method of claim 7, further comprising:
  obtaining a navigation sequence from a first user;
  determining that one or more of the user embeddings associated with the first user are sufficient to predict a probable next-action of the first user; and
  applying the next-user-action predictive model to the one or more user embeddings associated with the first user to predict a probable next-action of the first user.

10. The computer-implemented method of claim 7, further comprising:
  obtaining a navigation sequence from a first user;
  determining that one or more of the user embeddings associated with the first user are insufficient to predict a probable next-action of the first user; and
  applying the next-action predictive model to the one or more user embeddings associated with the first user and to user embeddings associated with other users included in a subset of users with which the first user has been identified to predict a probable next-action of the first user.

11. A computer system comprising:
  one or more processors; and
  one or more computer storage media storing computer useable instructions to cause the one or more processors to:
  obtain a set of navigation sequences associated with a set of users, each navigation sequence in the set of navigation sequences including a set of user actions sequentially performed during a navigation session, each navigation sequence being associated with a user included in the set of users, and each navigation sequence being obtained as a series of tuples, each tuple comprising (1) an identifier of a user action taken at a particular point in time, (2) an identifier associated with a user that performed the user action taken, and (3) an indicator of an amount of time spent on the user action taken;
  apply a Time-Aware Recurrent Neural Network (RNN) to the set of navigation sequences to encode each navigation sequence in the set of navigation sequences into a user embedding that reflects a temporally-defined navigation pattern for the associated user; and apply a classifier trained to a specific target action to the user embeddings to create a next-user-action predictive model for predicting the probability that a next-action performed by a target user is the target action.

12. The computer system of claim 11, wherein the one or more processors are further caused to identify subsets of users, each subset including users included in the set of users that are associated with a similar temporally-defined navigation pattern.

13. The computer system of claim 12, wherein the one or more processors are caused to identify the subsets of users utilizing K-means clustering.

14. The computer system of claim 12, wherein the one or more processors are further caused to:
- obtain a navigation sequence from a first user;
- determine that one or more of the user embeddings associated with the first user are sufficient to predict a probability that a next-action performed by the first user is the target action; and
- apply the next-user-action predictive model to the one or more user embeddings associated with the first user to predict a probability that the next-action performed by the first user is the target action.

15. The computer system of claim 12, wherein the one or more processors further are caused to:
- obtain a navigation sequence from a first user;
- determine that one or more of the user embeddings associated with the first user are insufficient to predict a probability that a next-action performed by the first user is the target action; and
- apply the next-user-action predictive model to the one or more user embeddings associated with the first user and to user embeddings associated with other users included in a subset of users with which the first user has been identified to predict a probability that the next-action performed by the first user is the target action.

16. A computer-implemented method for generating next user-action predictive models using navigation sequences, the method comprising:

means for obtaining a set of navigation sequences associated with a set of users, each navigation sequence in the set of navigation sequences including a set of user actions performed during a navigation session, each navigation sequence being associated with a user included in the set of users, and each navigation sequence containing time-based information for each action in the set of user actions;

means for applying a Recurrent Neural Network (RNN) to the set of navigation sequences to encode each navigation sequence in the set of navigation sequences into a user embedding that reflects a temporally-defined navigation pattern for the associated user, the RNN being a Time-Aware RNN and including Long Short Term Memory architecture; and means for applying a classifier to the user embeddings to create a next-user-action predictive model for predicting next-actions of users.

17. The computer-implemented method of claim 16, wherein the classifier is a target-action classifier that predicts a probability that a next-action performed by a target user is a specific target-action.

18. The computer-implemented method of claim 16, wherein the means for obtaining the set of navigation sequences associated with the set of users includes means for obtaining the set of navigation sequences as a series of tuples, each tuple comprising (1) an identifier of a user action taken at a particular point in time, (2) an identifier associated with a user that performed the user action taken, and (3) an indicator of an amount of time spent on the user action taken.

19. The computer-implemented method of claim 16, further comprising means for identifying one or more subsets of users, each subset including users included in the set of users that are associated with a similar temporally-defined navigation pattern.

20. The computer-implemented method of claim 19, wherein the means for identifying one or more subsets of users identifies the one or more subsets of users utilizing K-means clustering.

* * * * *